United States Patent
Kirita et al.

(10) Patent No.: US 10,338,728 B2
(45) Date of Patent: Jul. 2, 2019

(54) METHOD, COMPUTER, AND STAMP SYSTEM

(71) Applicant: KOTO CO., LTD., Kyoto (JP)

(72) Inventors: Hiroshi Kirita, Kyoto (JP); Junpei Shibata, Kyoto (JP)

(73) Assignee: KOTO CO., LTD, Kyoto (JP)

( * ) Notice: Subject to any disclaimer, the term of this patent is extended or adjusted under 35 U.S.C. 154(b) by 0 days.

(21) Appl. No.: 15/291,916

(22) Filed: Oct. 12, 2016

(65) Prior Publication Data

US 2017/0177142 A1    Jun. 22, 2017

(30) Foreign Application Priority Data

Oct. 16, 2015    (JP) ................................. 2015-204892

(51) Int. Cl.

| | | |
|---|---|---|
| *G06F 3/041* | (2006.01) | |
| *G06F 3/0488* | (2013.01) | |
| *G06Q 10/02* | (2012.01) | |
| *G06F 3/0354* | (2013.01) | |
| *G06F 21/34* | (2013.01) | |
| *H04W 4/02* | (2018.01) | |
| *G06F 3/033* | (2013.01) | |

(52) U.S. Cl.
CPC ........ *G06F 3/0416* (2013.01); *G06F 3/03547* (2013.01); *G06F 3/0488* (2013.01); *G06F 21/34* (2013.01); *G06Q 10/02* (2013.01); *H04W 4/02* (2013.01); *G06F 3/033* (2013.01); *G06F 3/041* (2013.01); *G06F 2203/04104* (2013.01)

(58) Field of Classification Search
CPC combination set(s) only.
See application file for complete search history.

(56) References Cited

U.S. PATENT DOCUMENTS

| | | |
|---|---|---|
| 2014/0368430 A1 | 12/2014 | Choi |
| 2016/0125323 A1 | 5/2016 | Uenishi et al. |
| 2018/0268397 A1* | 9/2018 | Hwang .................. G06Q 20/32 |

FOREIGN PATENT DOCUMENTS

| | | |
|---|---|---|
| JP | 05-089220 A | 4/1993 |
| JP | 2012-099093 A | 5/2012 |

(Continued)

OTHER PUBLICATIONS

Great Britain Search Report dated Nov. 30, 2016, for Great Britain Application No. 1617398.1.

(Continued)

*Primary Examiner* — Robin J Mishler
(74) *Attorney, Agent, or Firm* — Global IP Counselors, LLP

(57) ABSTRACT

A ticket image (trigger information), an imprint image, and special information (related information) are preliminarily stored in a computer including a touch panel. First, the ticket image is displayed on the touch panel. Then, when a stamp device is placed on the touch panel, the imprint image is displayed on the ticket image in an overlapped manner. Therefore, an intrinsic purpose of the stamp device is achieved. From this state, an icon is further displayed in the imprint image. When the icon is selected, the special information is outputted. As described, pressing a stamp with the stamp device is a necessary condition for outputting the special information, thus a "key" function for providing information is added to the stamp device.

15 Claims, 11 Drawing Sheets

(56) References Cited

FOREIGN PATENT DOCUMENTS

| | | |
|---|---|---|
| JP | 2012-256246 A | 12/2012 |
| JP | 2015-005275 A | 1/2015 |
| WO | 2014/157170 A1 | 10/2014 |
| WO | 2014/189068 A1 | 11/2014 |
| WO | 2015/016120 A1 | 2/2015 |

OTHER PUBLICATIONS

Japanese Official Action issued in Japanese Application No. 2015-204892 dated Nov. 26, 2015; Notification of reasons of refusal and English translation submitted herewith (8 Pages).

Notification of Decision to Grant Patent issued in Japanese Application No. 2015-204892 dated Mar. 18, 2016; English translation submitted herewith (6 Pages).

* cited by examiner

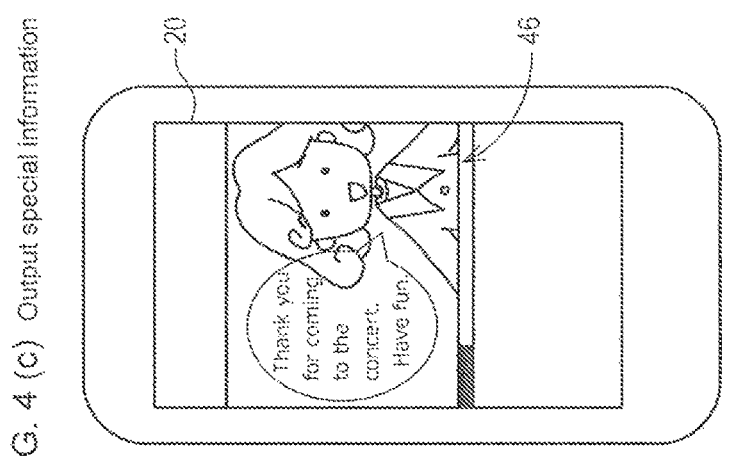
FIG. 4 (c) Output special information
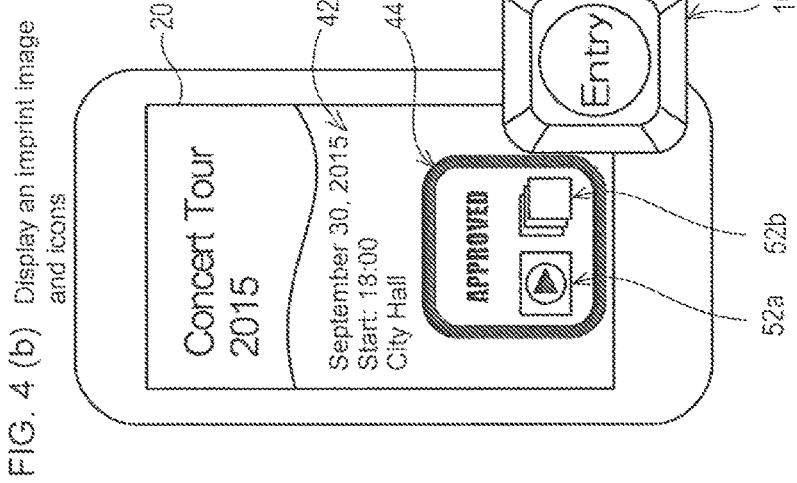
FIG. 4 (b) Display an imprint image and icons
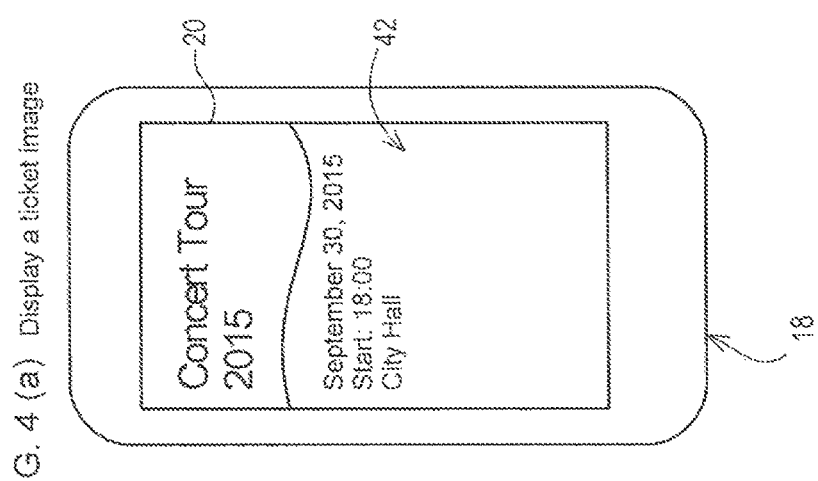
FIG. 4 (a) Display a ticket image FIG. 6 (a) Check point table

| Check point identification information | Separate stamp sheet identification information | Imprint identification information | Related identification information | Stamp identification information | Arrival flag |
|---|---|---|---|---|---|
| 001 | point01.jpg | drum.jpg | drum.mp3 | stmp01 | chk01 |
| 002 | point02.jpg | keyboard.jpg | keyboard.mp3 | stmp02 | chk02 |
| 003 | point03.jpg | guitar.jpg | guitar.mp3 | stmp03 | chk03 |
| 004 | point04.jpg | recorder.jpg | recorder.mp3 | stmp04 | chk04 |
| ... | ... | ... | ... | ... | ... |

FIG. 6 (b) Contact surface table

| Stamp identification information | Comparison information | | |
|---|---|---|---|
| | among a-d | among b-d | between c-d |
| stmp01 | 10 | 10 | 10 |
| stmp02 | 20 | 20 | 15 |
| stmp03 | 30 | 30 | 20 |
| stmp04 | 40 | 40 | 30 |
| ... | ... | ... | ... |

 48

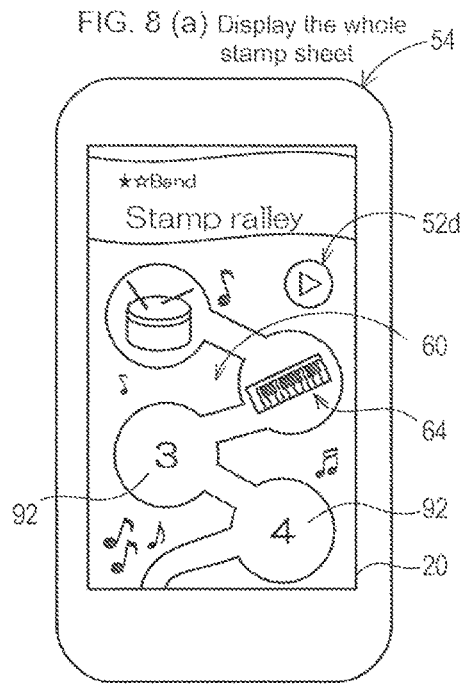
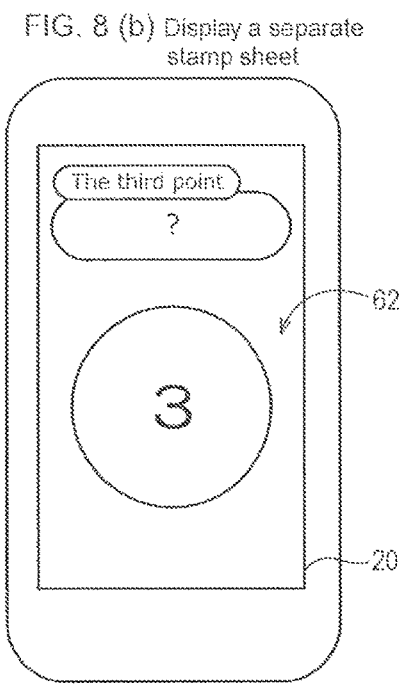
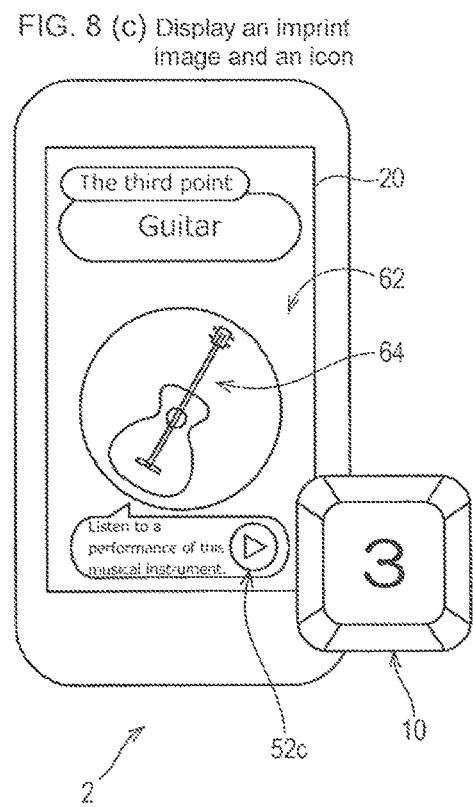
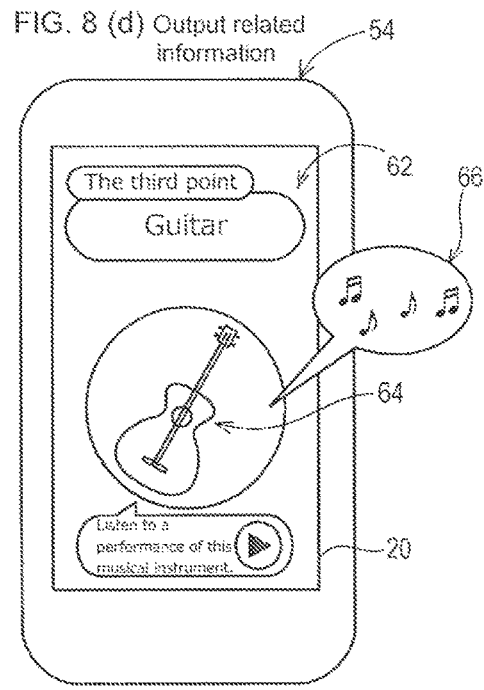

METHOD, COMPUTER, AND STAMP SYSTEM

CROSS-REFERENCE TO RELATED APPLICATION

This application claims priority to Japanese Patent Application No. 2015-204892 filed on Oct. 16, 2015. The entire disclosure of Japanese Patent Application No. 2015-204892 is hereby incorporated herein by reference.

BACKGROUND

Technical Field

The present invention relates to a software technology used by a computer including a touch panel, such as a portable information terminal.

Related Art

A computer including a touch panel detects a touched position when a user touches with a fingertip or a touch pen on an input surface of the touch panel to execute a process in accordance with this touched position. Such a touch panel that is currently widely used can detect a plurality of touched positions, i.e. the touch panel is multi-touch detectable. Based on such a property, a stamp type device has newly been provided as an input device.

For example, a system described in Japanese Unexamined Patent Application Publication No. 2012-256246 includes a stamp type device having a plurality of contact terminals. When this stamp type device is placed on an input surface of a touch panel, positions touched by the contact terminals are detected, and a plurality of coordinates of the detected touched positions on the input surface is input. A terminal device including the touch panel converts the plurality of input coordinates into codes, and sends the codes to a server. The server compares the received codes with preliminarily stored codes, and replies an electronic stamp image corresponding to the conformed codes to the terminal device. Upon receiving the electronic stamp image, the terminal device displays an electronic document added with the electronic stamp image on the touch panel. Therefore, the stamped electronic document is created.

However, the above described system is a system that merely extends an intrinsic function of a stamp into electronic documents to show a responsibility or a privilege by leaving an imprint on a document.

SUMMARY

In view of the above situation, embodiments and aspects of the present invention are capable of adding a new function to a stamp type device.

To achieve the above described object, according to a first aspect of the present invention, there is provided a method which includes the steps of: (a) displaying trigger information prompting an input through the stamp type device on the touch panel, (b) acquiring the positional information inputted through the stamp type device, (c) displaying an imprint image representing an imprint corresponding to the stamp type device on the touch panel in the case where the acquired positional information satisfies a predetermined condition, (d) outputting guidance information for guiding an operation to instruct a computer which has the touch panel in the case where the imprint image is displayed; and (e) outputting information relating to either or both of the trigger information and the imprint image in the case where the imprint image is displayed.

In addition, to achieve the above described object, a computer according to a second aspect of the present invention provided with a touch panel having an input surface to be inputted with positional information through a stamp type device when the stamp type device is placed on the input surface and including a computer program, wherein the computer is configured to execute the computer program, and the computer program comprises instructions which, when executed by the computer, cause the computer to: display trigger information prompting an input through a stamp type device; acquire the positional information inputted through the stamp type device; display an imprint image representing an imprint corresponding to the stamp type device on the touch panel in the case where the acquired positional information satisfies a predetermined condition; output guidance information for guiding an operation to instruct the computer in the case where the imprint image is displayed; and output information relating to either or both of the trigger information and the imprint image in the case where the operation is performed in accordance with the guidance information.

In addition, to achieve the above described object, a stamp system according to a third aspect of the present invention includes a computer including a touch panel having an input surface, and a stamp type device placed on the input surface of the touch panel to enter positional information with respect to the input surface. The computer further includes an acquisition unit for acquiring the positional information inputted through the stamp type device, a trigger information display unit for displaying trigger information prompting an input through the stamp type device on the touch panel, an imprint image display unit for displaying an imprint image representing an imprint corresponding to the stamp type device on the touch panel in the case where the acquired positional information satisfies a predetermined condition, and an output unit for outputting guidance information for guiding an operation to instruct the computer in the case where the imprint image is displayed, and outputting information relating to either or both of the trigger information and the imprint image in the case where the operation is performed in accordance with the guidance information.

According to a fourth aspect of the present invention, positional information inputted through a stamp type device is acquired, and, in the case where the acquired positional information satisfies a predetermined condition, not only an imprint image is displayed, but also related information is outputted. That is, the stamp type device is used to function as a "key" for providing related information, and thus such a new function is added to the stamp type device.

For a full understanding of the present invention, reference should now be made to the following detailed description of the preferred embodiments of the invention as illustrated in the accompanying drawings.

BRIEF DESCRIPTION OF THE DRAWINGS

FIGS. 4 (*a*), 4 (*b*), and 4 (*c*) are views illustrating the above described portable information terminal in various states, where FIG. 4 (*a*) is a view when a ticket image is displayed, FIG. 4 (*b*) is a view when an imprint image and icons are displayed, and FIG. 4 (*c*) is a view when special information is output;

FIG. 6 (*a*) is a view illustrating a check-point table; FIG. 6 (*b*) is a view illustrating a contact surface table;

FIGS. 8 (*a*), 8 (*b*), 8 (*c*), and 8 (*d*) are views illustrating the above described portable information terminal in various states, where FIG. 8 (*a*) is a view when a whole stamp sheet image is displayed, FIG. 8 (*b*) is a view when a separate stamp sheet image is displayed, FIG. 8 (*c*) is a view when an imprint image and an icon are displayed, and FIG. 8 (*d*) is a view when related information is output;

FIG. 9 (*b*) is a conceptual diagram of a computer of a server;

DETAILED DESCRIPTION OF EMBODIMENTS

Figure 1:
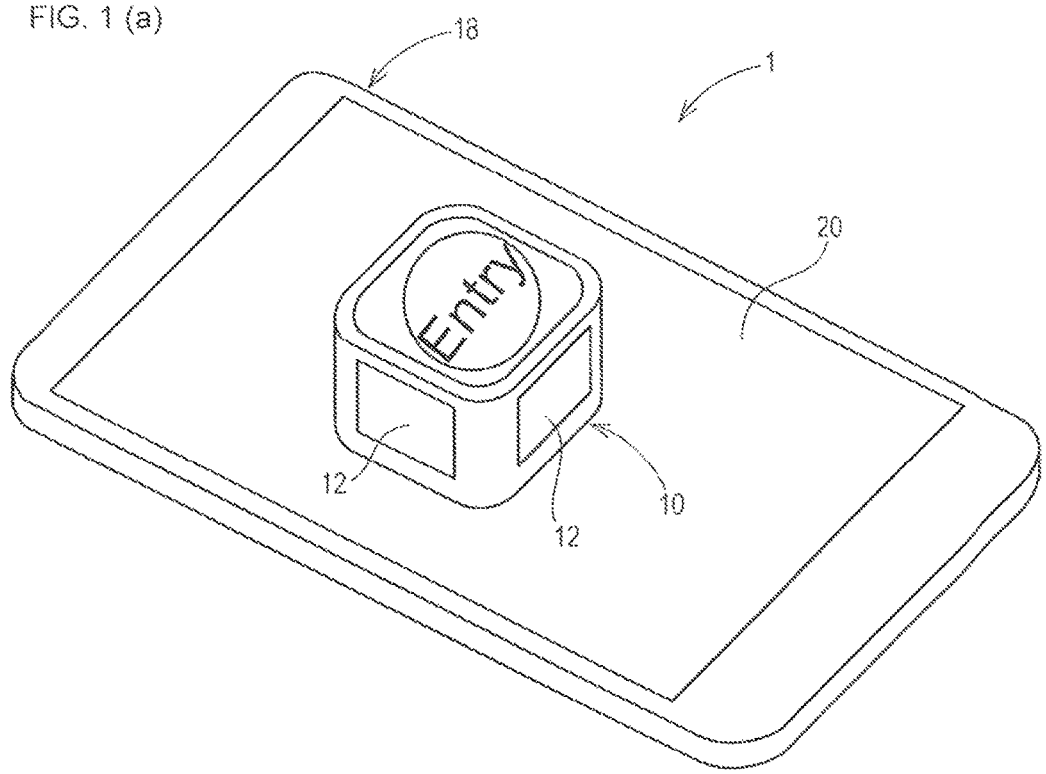
FIG. 1(a) is a view illustrating how a portable information terminal and a stamp type device are used in a stamp system according to a first embodiment of the present invention.
FIG. 1(b) is a perspective view of the stamp type device when viewed from beneath.
Figure 1:
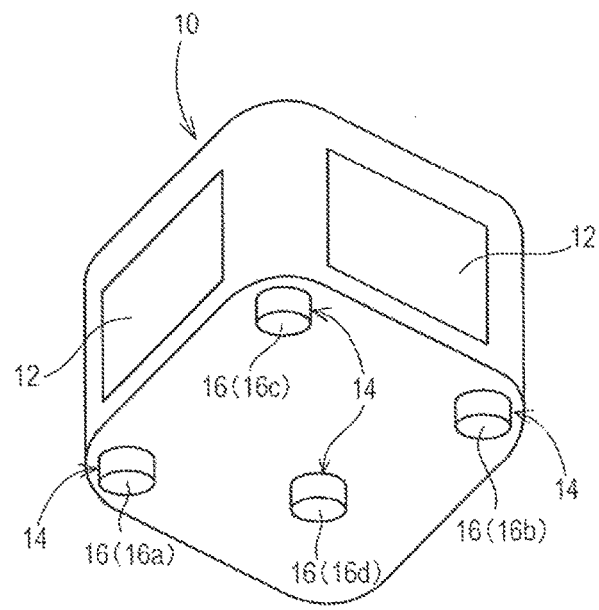

The preferred embodiments of the present invention will now be described with reference to FIGS. 1(*a*) to 11. Identical elements in the figure are designated with the same reference numerals.

First Embodiment

With reference to FIGS. 1 (*a*) to 4 (*c*), a stamp system 1 according to a first embodiment of the present invention will now be described herein, using an electronic ticket, as an example, displayed on a portable information terminal owned by a visitor of a concert event so that a receptionist can accept entry.

The stamp system 1 according to the first embodiment of the present invention includes a stamp type device (hereinafter referred to as "stamp device," with a reference numeral "10") having an approximately rectangular parallelepiped shape and held by the receptionist for accepting entry. A stamp device 10 is formed with a holding portion 12 on its each side so that the receptionist can hold the stamp device. On a bottom surface of the stamp device 10, four projections 14 are formed downwardly. The projections 14 are identical in height, and each have an apical surface forming a contact surface 16 having at least a constant area. The holding portions 12 and the projections 14 are each made of a material having electrical conductivity, and the contact surfaces 16 and the holding portions 12 are configured to conduct each other. Accordingly, the contact surfaces 16 and the receptionist conduct each other via the holding portions 12. The four contact surfaces 16 include three reference contact surfaces 16*a* to 16*c* disposed near corners on the bottom surface, and an intrinsic contact surface 16*d*. The receptionist places the stamp device 10 on a touch panel 20 of the visitor's portable information terminal (hereinafter referred to as "visitor terminal," with a reference numeral "18") described later so that these contact surfaces 16 each come into contact with the touch panel 20.

A visitor terminal 18 accepted by the stamp system 1 is a smart device represented by smartphone or tablet terminal. The touch panel 20 of the visitor terminal 18 includes a liquid crystal display 22 and a sensor 24 shaped into a film or a similar form and disposed on this liquid crystal display 22. The sensor 24 is connected to a touch panel controller 26. The touch panel controller 26 controls the sensor 24 to detect a coordinate, i.e. positional information, based on a change in capacitance generated in the sensor 24. In addition, when a plurality of contact portions come into contact with a surface, i.e. input surface, of the touch panel 20, the sensor 24 and the touch panel controller 26 detect coordinates of the contact portions. That is, a multi-touch coordinate detection is possible.

The visitor terminal 18 is achieved by a computer 36 including the above described touch panel 20, the touch panel controller 26, a memory 28, a central processing unit (hereinafter referred to as "CPU," with a reference numeral "30"), a network communication unit 32, and a loudspeaker 34.

The memory 28 of the computer 36 stores operating system 38. This operating system 38 is loaded by the CPU 30 when the computer 36 is turned on. The CPU 30 loaded with the operating system 38 can execute various applications stored in the memory 28, and can connect to an internet communication line via the network communication unit 32.

The memory 28 of the computer 36 stores a ticket application program (hereinafter simply referred to, in the first embodiment of the present invention, as "application," with a reference numeral "40"). After a ticket is purchased, an application 40 is downloaded from a server (not shown) via an internet communication line, and stored in the memory 28. Such a memory 28 includes, but not limited to, a semiconductor memory, such as nonvolatile memory typically represented by Flash Memory.

The application 40 stored in the memory 28 includes a ticket image 42, an imprint image 44, and special information 46. The ticket image 42 is a still image displaying details of a concert including a name, a date, and a time of the concert. The imprint image 44 is a still image displaying an imprint corresponding to the stamp device 10. The special information 46 includes a message video, a photo image, and other special items provided, as visitor benefits, by an artist performing at the concert.

The application 40 further includes comparison information 48 and an entry flag 50. The comparison information 48 includes information on a distance between the reference contact surface 16*a* and the intrinsic contact surface 16*d* of the stamp device 10, information on a distance between the reference contact surface 16*b* and the intrinsic contact surface 16*d*, and information on a distance between the reference contact surface 16*c* and the intrinsic contact surface 16*d*. The distance information includes numeric values preliminarily determined based on distance values measured between each of the reference contact surfaces 16*a* to 16*c* and the intrinsic contact surface 16*d*. The entry flag 50 stores information on if a visitor is allowed to enter. Its initial value is cleared.

When the application 40 is selected at a time of admission, the CPU 30 of the computer 36 loads the application 40 into an internal memory to execute the application. Thus, the application 40 starts, and the computer 36 operates as described below.

First, the CPU 30 displays, as shown in FIG. 4 (*a*), the ticket image 42 on the liquid crystal display 22 of the touch panel 20 (s10). This allows the visitor to present the ticket image 42 to a receptionist. As described, the CPU 30 functions as a ticket image display unit for displaying the ticket image 42 on the touch panel 20.

Next, the CPU 30 refers to the entry flag 50 (s11). In the case where this entry flag 50 is set (s11: Yes), the CPU 30 displays the imprint image 44 described later (s15). This allows, as shown in FIG. 4 (*b*), the liquid crystal display 22 to display the ticket image 42 and the imprint image 44.

On the other hand, in the case where no entry flag 50 is set (s11: No), the liquid crystal display 22 only shows the ticket image 42 (FIG. 4 (*a*)). The receptionist at this time places the stamp device 10 on the touch panel 20. Next, the CPU 30 acquires, via the touch panel controller 26, coordinates (hereinafter referred to as "contact surface coordinates") of the contact surfaces 16 contacting with the touch panel 20 (s12). As described, the ticket image 42 displayed on the touch panel 20 is trigger information prompting an input through the stamp device 10. In addition, the touch panel 20, the touch panel controller 26, and the CPU 30 function as an acquisition unit for acquiring contact surface coordinates inputted by the stamp device 10.

Next, the CPU 30 compares the acquired contact surface coordinates with the comparison information 48 (s13). Specifically, the CPU 30 calculates direct distances between the acquired contact surface coordinates to determine that two of the contact surface coordinates forming a longest direct distance are inputted by the reference contact surfaces 16*a* and 16*b* of the stamp device 10 (hereinafter referred to as "reference coordinates a and b"). Then, the CPU 30 determines that a contact surface coordinate equidistant and farthest from each of the determined reference coordinates a and b is inputted by the reference contact surface 16*c* of the stamp device 10 (hereinafter referred to as "reference coordinate c"). As described, the CPU 30 determines, based on the acquired contact surface coordinates, the reference coordinates a to c corresponding to the reference contact surfaces 16*a* to 16*c* of the stamp device 10, and further determines that a remaining contact surface coordinate corresponds to the intrinsic contact surface 16*d* of the stamp device 10 (hereinafter referred to as "intrinsic coordinate d"). Then, the CPU 30 compares, among the calculated direct distances, each of the direct distances between each of the reference coordinates a to c and the intrinsic coordinate d with the distance information in the comparison information 48. As described, the CPU 30 functions as a comparison unit for comparing the acquired contact surface coordinates with the comparison information 48.

If, in a comparison, any or all of the contact surface coordinates does (do) not conform to the comparison information 48 (s13: No), the CPU 30 displays information such as "The ticket cannot be approved" on the liquid crystal display 22, and acquires coordinates again.

On the other hand, in the case where the contact surface coordinates conform to the comparison information 48 (s13: Yes), the CPU 30 sets the entry flag 50 (s14). This entry flag 50 is saved into the memory 28 when the application 40 ends. Accordingly, the CPU 30 can determine that, when the application 40 restarts, the application has been approved for entry by referring to the entry flag 50 (s11).

Next, the CPU 30 displays, on the liquid crystal display 22, as shown in FIG. 4 (*b*), the imprint image 44 on the ticket image 42 in an overlapped manner (s15). At this time, preferably, a center coordinate of the bottom surface of the stamp device 10 placed on the touch panel 20 is calculated based on the acquired reference coordinates a and b to display the imprint image 44 so that a center of the imprint image 44 is aligned on the center coordinate. Displaying the imprint image 44 demonstrates that the ticket image 42 is approved for validness by an organizer of the concert. As described, the CPU 30 functions as an imprint display unit for displaying the imprint image 44 on the touch panel 20 in the case where the acquired contact surface coordinates conform to the comparison information 48.

In the case where the CPU 30 displays the imprint image 44, the CPU 30 further displays icons 52*a* and 52*b* on the liquid crystal display 22 (s16). The icons 52*a* and 52*b* are symbolized figures or pictographs, or still images symbolized from message videos or photo images, so as to show the special information 46 in an easily understandable manner. When the visitor selects either the icon 52*a* or 52*b* (s17: Yes), the CPU 30 outputs special information 46 corresponding to the selected icon 52*a* or 52*b* (s18). For example, in the case where the icon 52*a* indicating a video is selected, the CPU 30 displays, as shown in FIG. 4 (*c*), a performing artist's message video on the liquid crystal display 22, and outputs its message from the loudspeaker 34. As described, the CPU 30 allows the icons 52*a* and 52*b* to function as GUIs (Graphical User Interfaces) for outputting special information 46 when the visitor makes a selection. In addition, the CPU 30 functions as an output unit for displaying, in the case where either the GUIs is operated, corresponding special information 46 on the touch panel 20 and outputting a sound from the loudspeaker 34. Further, the special information 46 relates to the concert represented by the ticket image 42, i.e. trigger information.

The above described stamp system 1 according to the first embodiment of the present invention adds to the stamp device 10, in addition to a stamp-intrinsic function for acquiring contact surface coordinates inputted through the stamp device 10, and for displaying, in the case where the acquired contact surface coordinates conform to the comparison information 48, the imprint image 44 to demonstrate that the ticket image 42 is approved for validness, a "key" function for outputting special information 46 under a condition where the acquired contact surface coordinates conform to the comparison information. With such a stamp system 1, special information 46 can be disclosed to only visitors. Additionally, special information 46 relating to a content of the ticket image 42 can further satisfy the visitors of the concert event.

In addition, the visitors can easily find the icons 52*a* and 52*b*, i.e. GUIs, in the imprint image 44, appearing after a comparison.

Second Embodiment

With reference to FIGS. 5 to 8, a second embodiment of the present invention will now be described herein, using an electronic stamp sheet, as an example, for displaying a stamp sheet image for a music stamp rally on a portable information terminal (hereinafter referred to as participant terminal, with a reference numeral "54") possessed by a participant of the music stamp rally for collecting music images.

A stamp system 2 according to the second embodiment of the present invention includes a plurality of stamp devices 10. Each of the stamp devices 10 is available at each of check points for the stamp rally. Each of the stamp devices 10 shows, on its top surface, a sign, a symbol, or an illustration indicating the check point. The stamp devices 10 include contact surfaces 16 (FIG. 1(*b*)) each arranged at different positions. Specifically, among the stamp devices 10, three reference contact surfaces 16*a* to 16*c* are disposed at common positions, but a position of an intrinsic contact surface 16d differs from each other. That is, among the stamp devices 10, distances from the intrinsic contact surface 16d to the reference contact surfaces 16a to 16c differ from each other.

The participant terminal 54 participating the stamp system 2 according to the second embodiment of the present invention includes a hardware configuration identical or similar to a hardware configuration of the computer 36 (FIG. 2) of the visitor terminal 18 according to the above described first embodiment of the present invention.

A memory 28 of a computer 36 according to the second embodiment of the present invention stores the above described operating system 38. The memory 28 further stores a stamp rally application program (hereinafter referred to as, in the second embodiment of the present invention, "application," with a reference numeral "56"). The application 56 is downloaded from a server (not shown) via an internet communication line, and stored into the memory 28 when a participant participates in the stamp rally.

The application 56 stored in the memory 28 of the computer 36 includes comparison information 48 corresponding to each of the stamp devices 10. The comparison information 48 includes numeric values specified in an identical or similar manner to values according to the first embodiment of the present invention, and is stored in a contact surface table 58. This contact surface table 58 includes the comparison information 48 and stamp identification information in corresponding fields to which a record will be provided per each of the stamp devices 10 used for the stamp rally. This stamp identification information is used to identify the plurality of stamp devices 10 each other.

The application 56 further includes a whole stamp sheet image 60. The whole stamp sheet image 60 is a still image showing a course of the stamp rally.

The application 56 further includes a separate stamp sheet image 62, an imprint image 64, related information 66, and an arrival flag 68, corresponding to each check point. The separate stamp sheet image 62 is a still image displaying guidance such as a name or a number of a check point, and indicating an area in which one of the stamp devices 10 is placed. The imprint image 64 is a still image relating to a content of the check point, such as a drum, a keyboard, a guitar, or a recorder. The related information 66 is a sound relating to a content of the imprint image 64, such as a drum melody, a keyboard melody, a guitar melody, or a recorder melody. The arrival flag 68 stores information on if the participant has arrived at the check point.

Each of the above described separate stamp sheet image 62, the imprint image 64, and the related information 66 is added with identification information, such as file name, for identifying each other. In addition, each of the arrival flags 68 is added with a different flag name. The identification information and the flag name correspond to check point identification information identifying each check point. Specifically, the application 56 includes a check point table 70. The check point table 70 includes check point identification information, separate stamp sheet identification information, imprint identification information, related identification information, stamp identification information, and the arrival flags 68 in corresponding fields to which a record will be provided per check point. The check point identification information is defined so as to correspond to coordinate information for each check point displayed on the whole stamp sheet image 60.

When the participant who has arrived at a check point selects the application 56, the CPU 30 of the computer 36 loads the application 56 into an internal memory to execute the application. Thus, the application 56 starts, and the computer 36 operates as described below.

First, the CPU 30 reads and displays, as shown in FIG. 8 (a), the whole stamp sheet image 60 on the liquid crystal display 22 (s20).

Next, the CPU 30 displays check point(s) where the participant has passed (s21). Specifically, the CPU 30 refers to the check point table 70 to extract arrival flag(s) 68. And then the CPU 30 checks if the extracted arrival flag(s) 68 is (are) set. Next, the CPU 30 extracts imprint identification information corresponding to the set arrival flag(s) 68. Next, the CPU 30 reads imprint image(s) 64 to which this imprint identification information is applied to display the imprint image(s) 64 on corresponding check point(s) in the whole stamp sheet image 60. Accordingly, the imprint image(s) 64 corresponding to the check point(s) to which the participant has passed is(are) displayed on the whole stamp sheet image 60 (FIG. 8 (a)).

Next, when the participant selects another check point (s22), the CPU 30 extracts and stores check point identification information corresponding to the selected check point. Specifically, the CPU 30 preliminarily stores check point identification information associated with check point specification areas 92 in the whole stamp sheet image 60, specifies one of the check point specification areas 92 based on a coordinate selected and entered by the participant, and extracts the check point identification information corresponding to the specified check point specification area 92.

Next, the CPU 30 refers to the check point table 70 to extract separate stamp sheet identification information corresponding to the stored check point identification information. Then, the CPU 30 reads and displays, on the liquid crystal display 22, a separate stamp sheet image 62 to which the extracted separate stamp sheet identification information is applied, as shown in FIG. 8 (b)(s23).

Next, the CPU 30 refers to the check point table 70 to extract an arrival flag 68 corresponding to the stored check point identification information. Then, in the case where the extracted arrival flag 68 is set (s24: Yes), the CPU 30 displays the imprint image 64 (s28) (FIG. 8(c)).

On the other hand, in the case where the extracted arrival flag 68 is not set (s24: No), the separate stamp sheet image 62 is kept displayed on the liquid crystal display 22 (FIG. 8(b)). At this time, the participant places a stamp device 10 on the touch panel 20. Then, the CPU 30 acquires contact surface coordinates via the touch panel controller 26 (s25). As described, the separate stamp sheet image 62 is trigger information prompting an input through the stamp device 10.

Next, the CPU 30 refers to the check point table 70 to extract stamp identification information corresponding to the stored check point identification information. Then, the CPU 30 refers to the contact surface table 58 to extract comparison information 48 corresponding to the extracted stamp identification information. Then, as described in the first embodiment of the present invention, the CPU 30 determines a plurality of reference coordinates a to c and an intrinsic coordinate d, calculates distances from the intrinsic coordinate d to each of the reference coordinates a to c, and compares the calculated distances with the extracted comparison information 48 (s26).

In the case where the contact surface coordinates do not conform to the comparison information 48 in a comparison (s26: No), the CPU 30 acquires coordinates again.

On the other hand, in the case where the contact surface coordinates conform to the comparison information (s26: Yes), the CPU 30 refers to the check point table 70 to extract an arrival flag 68 corresponding to the stored check point identification information to set this arrival flag 68 (s27).

Next, the CPU 30 refers to the check point table 70 to extract imprint identification information corresponding to the stored check point identification information. Then, the CPU 30 displays, on the separate stamp sheet image 62, the imprint image 64 to which the extracted imprint identification information is applied, in an overlapped manner, as shown in FIG. 8(c) (s28). Therefore, the participant who has arrived at the target check point is approved.

Next, the CPU 30 displays, on the liquid crystal display 22, the imprint image 64 and an icon 52c (s29). In the application 56, the icon 52c is a play mark that symbolizes playing a sound, i.e. the related information 66. Then, when the participant selects this icon 52c (s30: Yes), the CPU 30 refers to the check point table 70 to extract related identification information corresponding to the stored check point identification information. Then, the CPU 30 outputs the sound, i.e. the related information 66, to which the extracted related identification information is applied to output the sound from the loudspeaker 34, as shown in FIG. 8(d) (s31). As described, a sound of a musical instrument, i.e. related information 66, relates to a musical instrument represented by the imprint image 64, i.e. information relating to the imprint image 64.

With the stamp system 2 according to the second embodiment of the present invention, the stamp device 10 functions, in addition to a stamp rally intrinsic purpose of approving that a participant has arrived at a check point, as a "key" for outputting a sound relating to the imprint image 64.

In addition, the application 56 according to the second embodiment of the present invention may include an icon 52d to be displayed on the whole stamp sheet image 60. When the participant selects this icon 52d, the CPU 30 refers to the check point table 70 to extract related identification information included in a record at which an arrival flag 68 is set. Then, the CPU 30 outputs related information 66 to which the extracted related identification information is applied to output the information from the loudspeaker 34. Therefore, the related information 66 (musical instrument melody) corresponding to a plurality of imprint images 64 (musical instrument image) collected by the participant is outputted. Therefore, after the participant has passed all check points, the participant is provided with a musical performance using all musical instruments.

Third Embodiment

Figure 9:
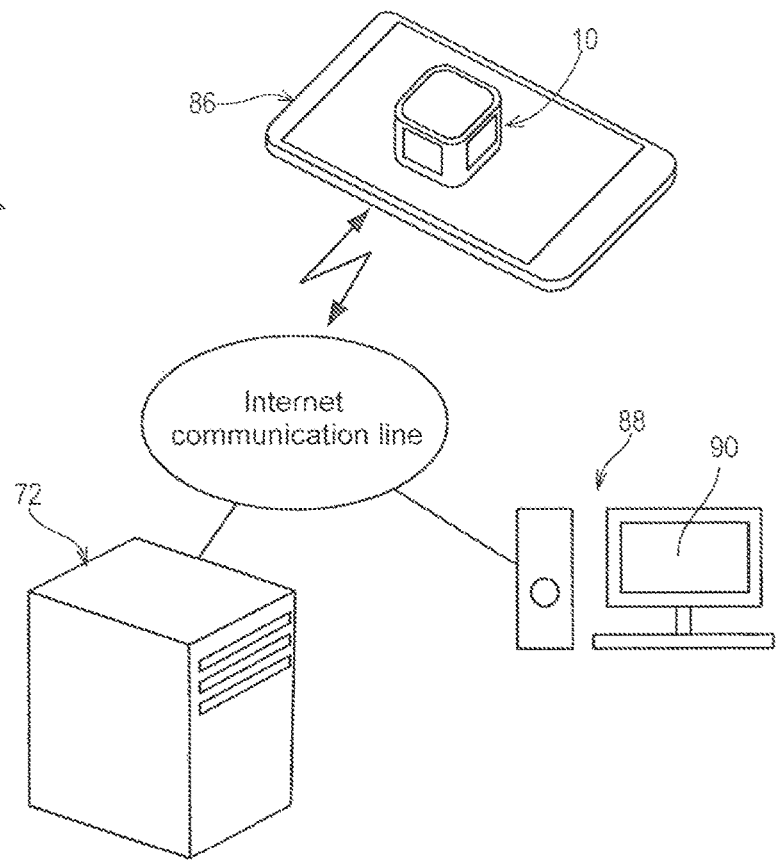
FIG. 9 (*a*) is a conceptual diagram of a stamp system according to a third embodiment of the present invention.
Figure 9:
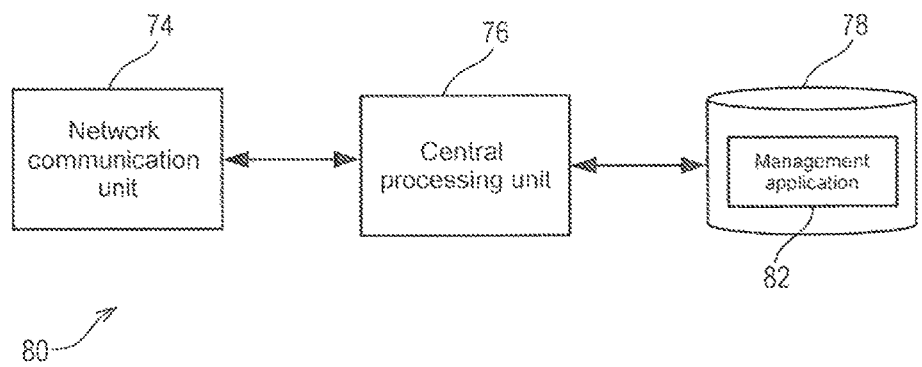
Figure 10:
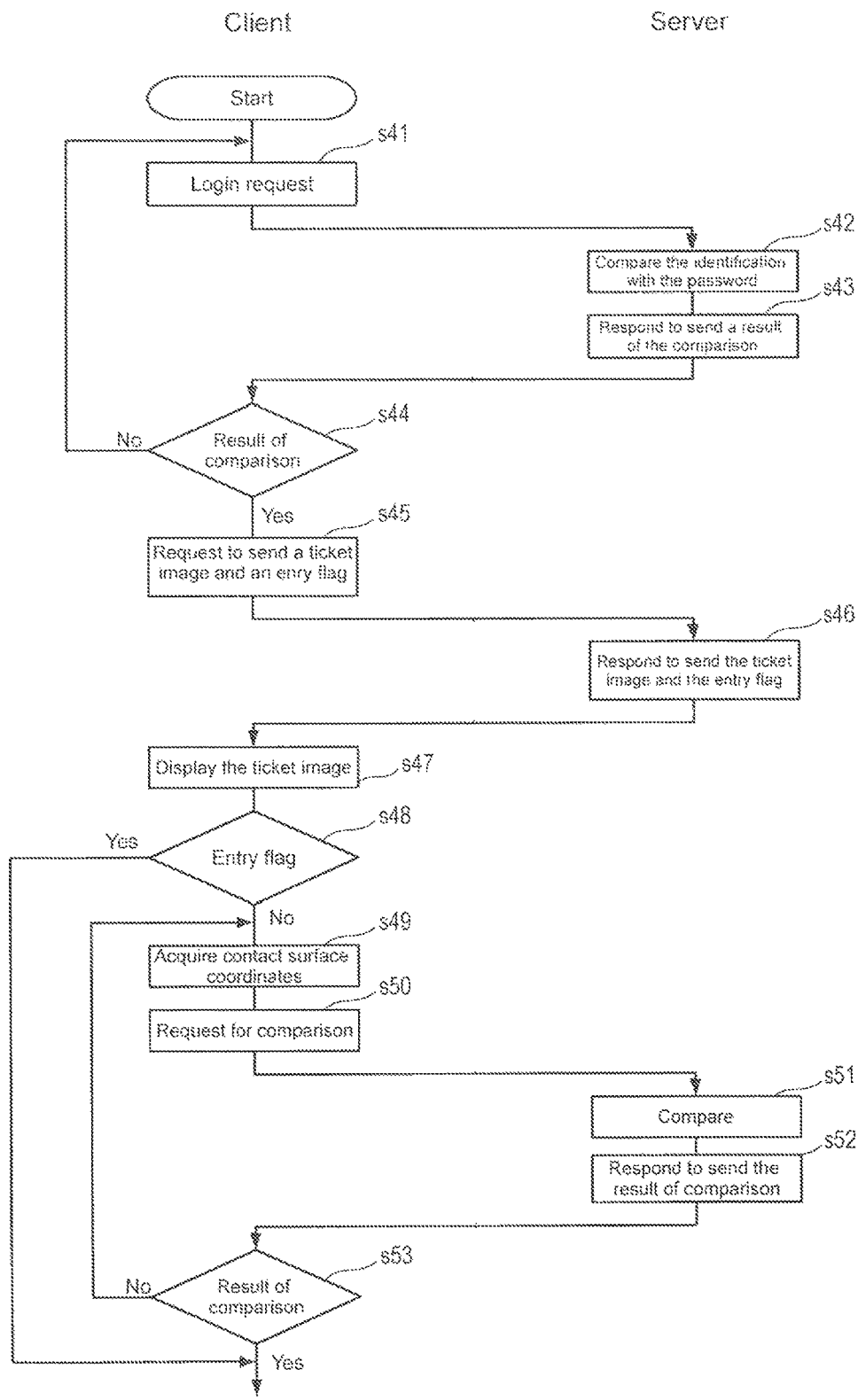
FIG. 10 is a flowchart for a portable information terminal and the server for use in the stamp system according to the third embodiment of the present invention.
Figure 11:
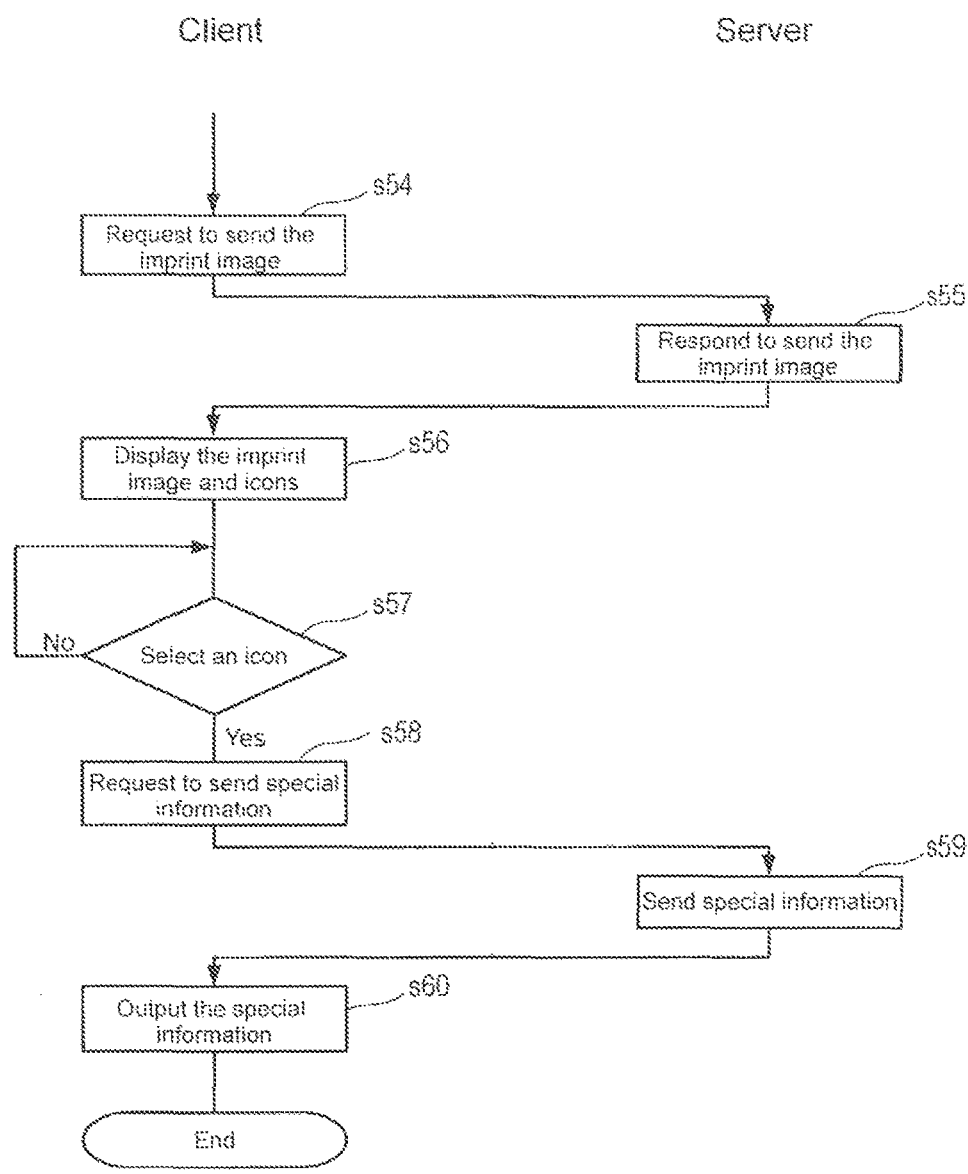
FIG. 11 is a continued flowchart of the above described flowchart.

A third embodiment of the present invention will now be described herein with reference to FIG. 9. A stamp system 3 according to the third embodiment of the present invention includes a server 72 owned by a service provider such as a concert organizer or a stamp rally promoter. This server 72 is achieved with a computer 80 including a network communication unit 74, a CPU 76, and a memory 78.

The memory 78 of the server 72 stores a management application 82 for managing users. This management application 82 includes a user management table 84. The user management table 84 includes user identification information, a password, and a conformity flag in corresponding fields to which a record will be provided per user. This user identification information is used to identify users each other, and applied to each user.

The CPU 76 of the computer 80 that has executed the above described management application 82 uses the network communication unit 74 to communicate, via an internet communication line, with a portable information terminal (hereinafter referred to as client, with a reference numeral "86") possessed by a user such as visitor or participant.

Figure 2:
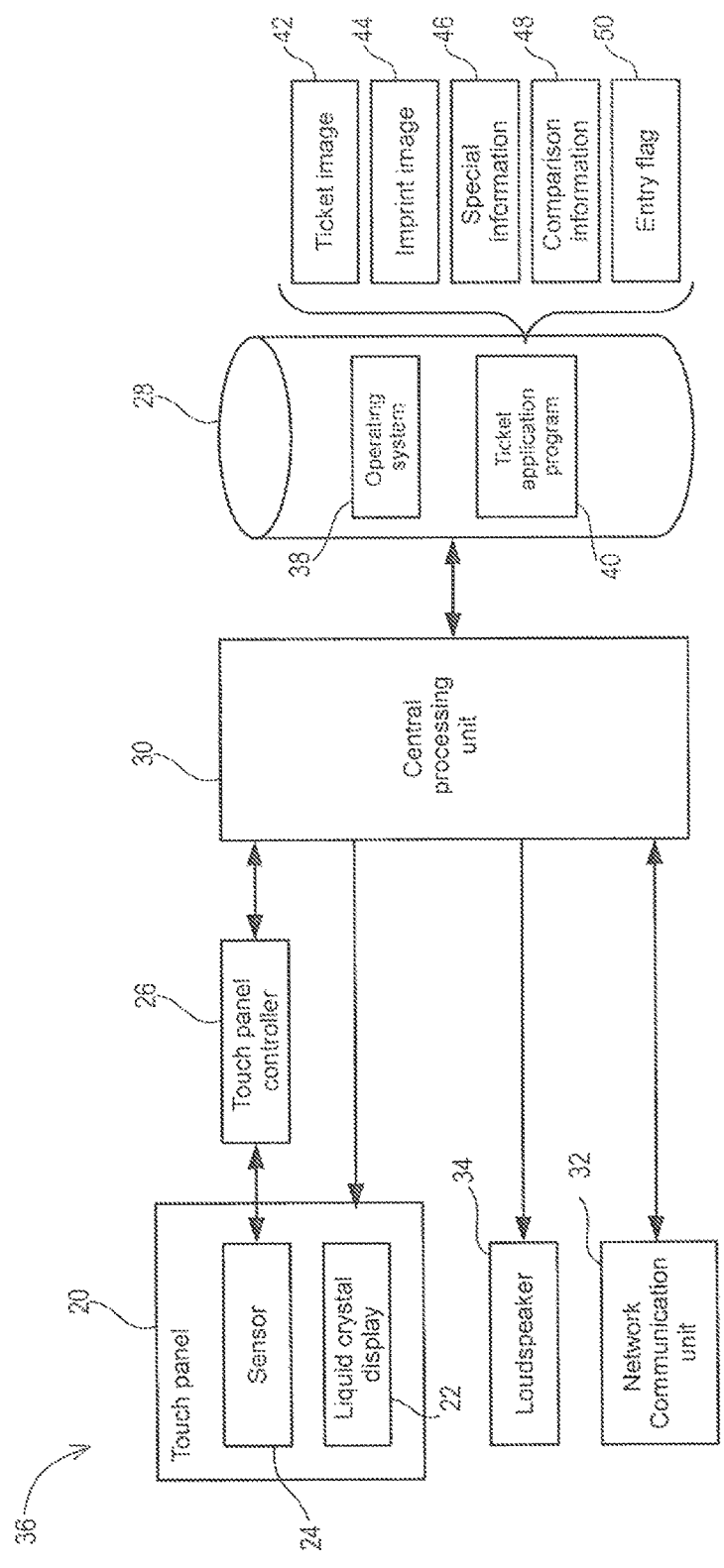
FIG. 2 is a conceptual diagram of the above described portable information terminal.
Figure 3:
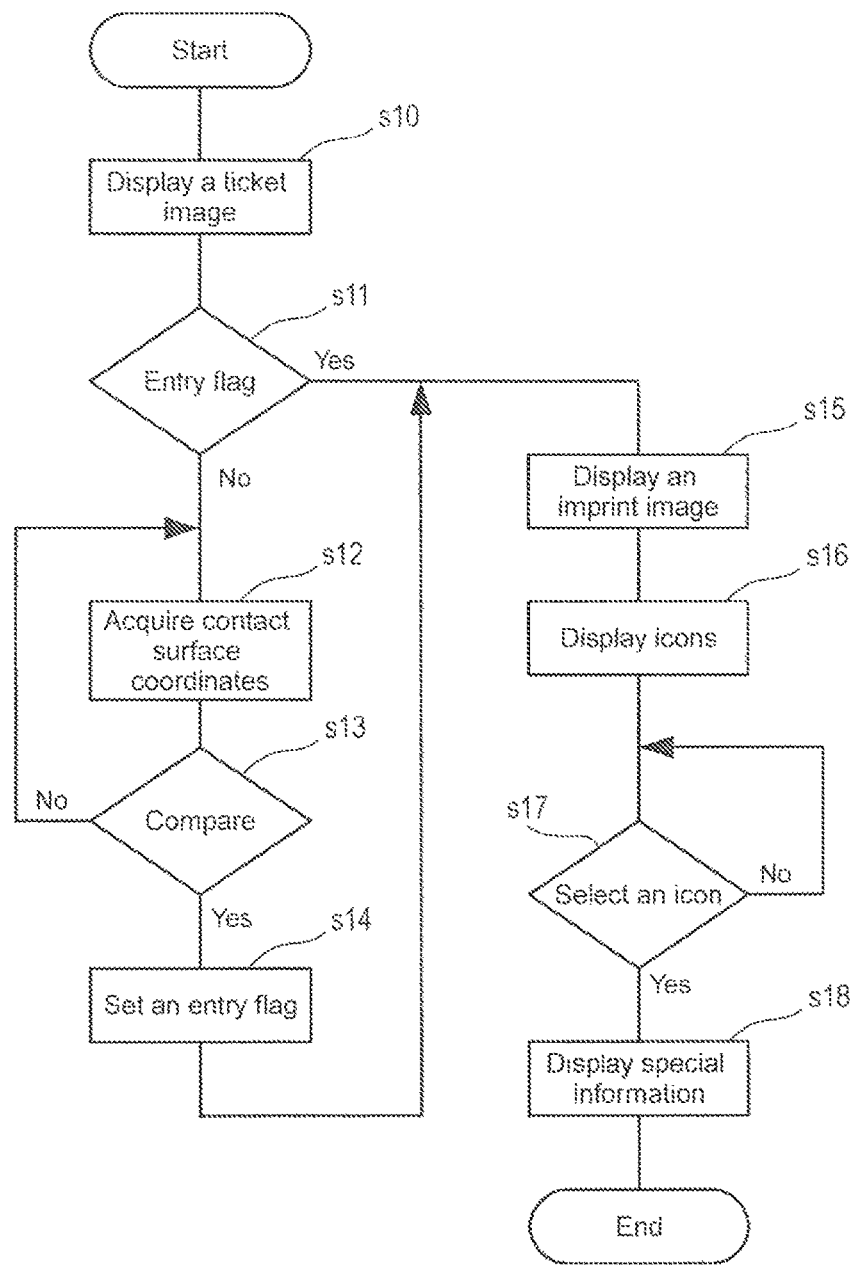
FIG. 3 is a flowchart of a computer program according to the first embodiment of the present invention.
Figure 5:
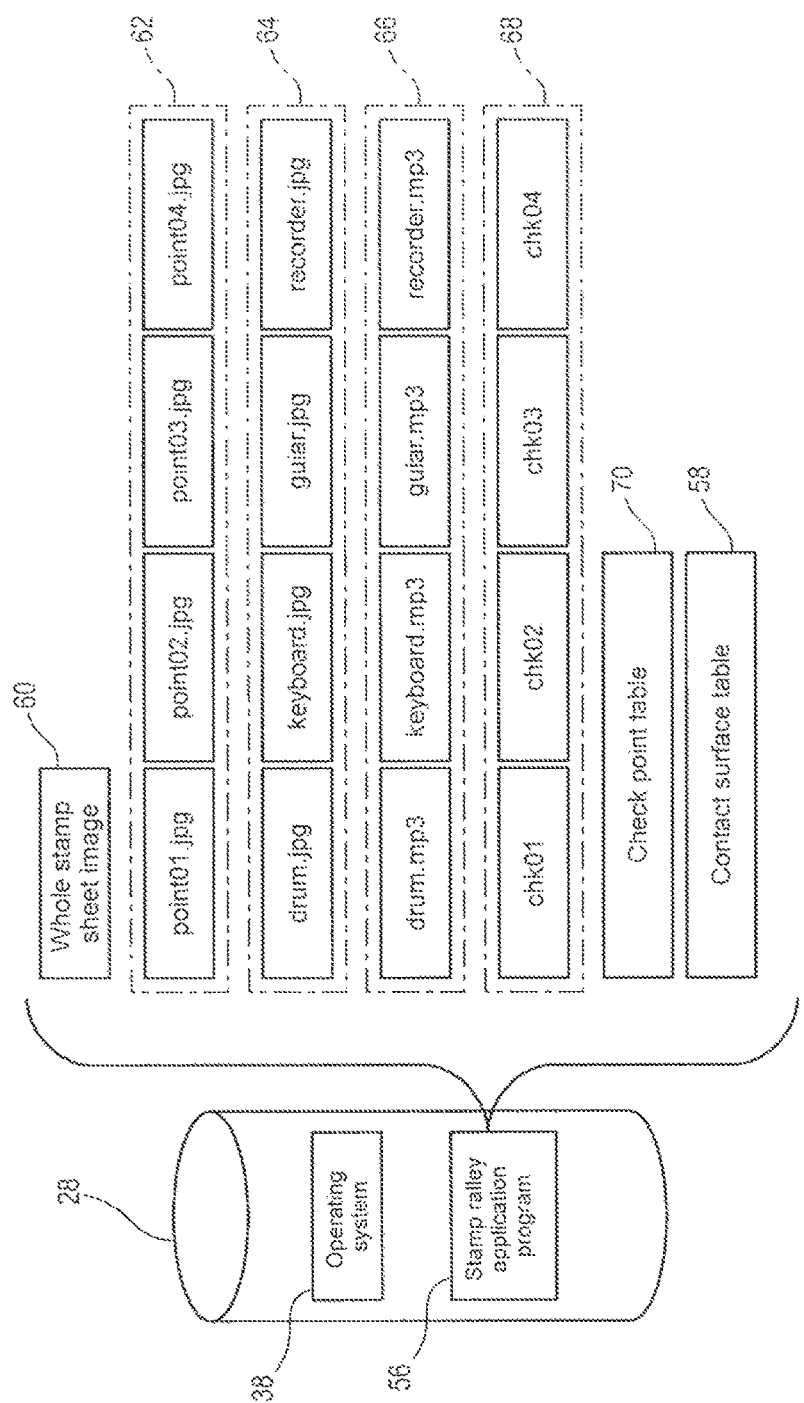
FIG. 5 is a conceptual diagram of a memory of a portable information terminal for use in a stamp system according to a second embodiment of the present invention.
Figure 7:
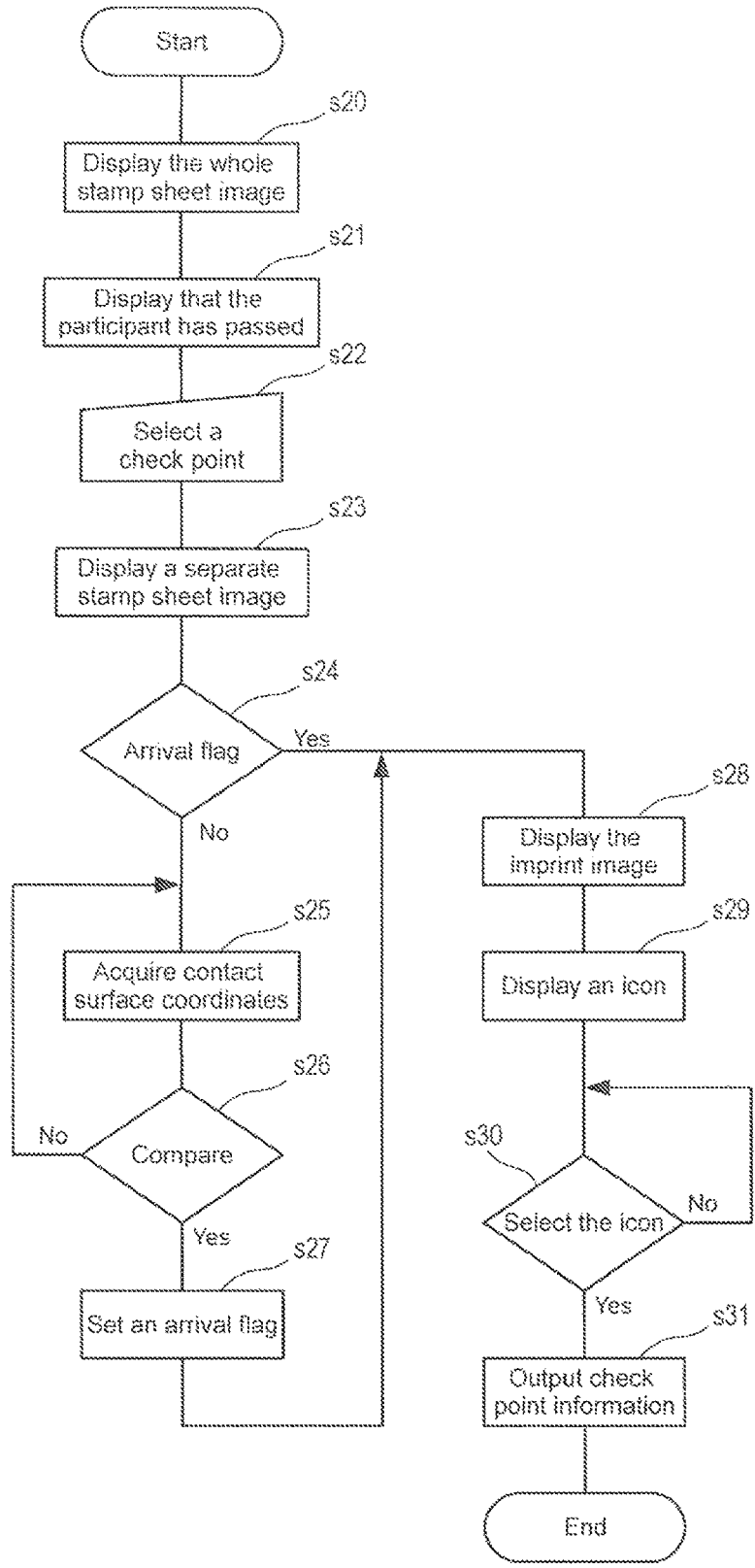
FIG. 7 is a flowchart of a computer program according to the second embodiment of the present invention.

The client 86 has a hardware configuration identical or similar to the hardware configuration of the computer 36 of the visitor terminal 18 according to the above described first embodiment of the present invention (FIG. 2). The memory 28 of this computer 36 stores application programs, such as the above described ticket application program or a stamp rally application program. In other words, the memory 28 stores a stamp application program to be executed by the computer 36 to display trigger information, to acquire contact surface coordinates of a stamp device 10, to display imprint images 44 and 64 in the case where the contact surface coordinates conform to comparison information 48, and to further display related information.

A stamp application according to the third embodiment of the present invention further includes user identification information for a user who uses the client 86. Such a stamp application is executed by the computer 36 of the client 86 to send, in the case where contact surface coordinates conform to comparison information 48, user identification information to the server 72.

The CPU 76 of the server 72 that has received the user identification information sets a conformity flag corresponding to this user identification information. Further, the CPU 76 of the server 72 sends, at any timing, a content of the user management table 84 to an information terminal 88 possessed by the service provider.

The information terminal 88 possessed by the service provider includes a network communication unit and a CPU (not shown) so that the CPU receives, via the network communication unit, the content of the user management table 84 sent from the server 72. Then, the CPU of the information terminal 88 displays the content of the received user management table 84 on a display 90. Therefore, the service provider is able to know how the user is approved.

In addition, in the stamp system 3 according to the third embodiment of the present invention, the memory 78 of the server 72 may preliminarily store all or part of trigger information, imprint images, and related information so that the CPU 76 of the server 72 responds to a request from the client 86 to provide these information and images. Further, the memory 78 of the server 72 may preliminarily store comparison information so as to respond to a request from the client 86 to perform a comparison, and to provide a result of the comparison.

An operation flow of such a client 86 and the server 72 to process an electronic ticket, as an example, will now be described herein with reference to FIGS. 9(a) to 11. At this point, the operation flow will be described under an assumption that the memory 78 of the server 72 is preliminarily stored with a ticket image 42, an imprint image 44, special information 46, and comparison information 48 (FIG. 2, FIG. 4).

First, the client 86 requests a login to the server 72 (s41). Specifically, the CPU 30 of the client 86 displays an entry box to prompt the user to enter a password, and then sends user identification information, together with the password entered in this entry box, to the server 72.

The CPU 76 of the server 72 responds to the received login request, refers to the user management table 84, compares the received user identification information and the password for conformity (s42), and sends a result of the comparison to the client 86 (s43).

In the case where the comparison is failed (s44: No), the CPU 30 of the client 86 that has received the result of the comparison requests a login again. On the other hand, in the case where the comparison is successful (s44: Yes), the CPU 30 of the client 86 requests the server 72 to send the ticket image 42 and a conformity flag (s45). This request and the user identification information are together sent to the server 72.

The CPU 76 of the server 72 that has received this request loads the ticket image 42 from the memory 78. In addition, the CPU 76 refers to the user management table 84 to extract the conformity flag corresponding to the user identification information. The server 72 responds to the client 86 to send the loaded ticket image 42 and the extracted conformity flag (s46).

The CPU 30 of the client 86 that has received the ticket image 42 and the conformity flag displays the ticket image 42 (s47) on the liquid crystal display 22. In addition, the CPU 30 of the client 86 confirms a content of the received conformity flag (s48). In the case where the conformity flag is set (s48: Yes), the operation flow proceeds to a request of sending the imprint image 44 (s54). On the other hand, in the case where the conformity flag is not set (initial state) (s48: No), the CPU 30 of the client 86 acquires contact surface coordinates for the stamp device 10 placed on the touch panel 20 (s49), sends these contact surface coordinates to the server 72, and requests the server 72 for comparison (s50).

The CPU 76 of the server 72 that has received the request of comparison compares the received contact surface coordinates with the comparison information 48 (s51). This comparison method may be identical or similar to a comparison method of the first embodiment of the present invention. As a result of comparison, in the case where the contact surface coordinates conform to the comparison information 48, the CPU 76 sets the conformity flag. Next, the CPU 76 responds to the client 86 to send this result of comparison (s52).

In the case where the CPU 30 of the client 86 receives a result that shows that the contact surface coordinates do not conform to the comparison information 48 (s53: No), the CPU 30 again acquires contact surface coordinates (s49), and requests for comparison (s50). On the other hand, in the case where the CPU 30 of the client 86 receives a result that shows that the contact surface coordinates conform to the comparison information 48 (s53: Yes), the CPU 30 requests the server 72 to send the imprint image 44 (s54).

The CPU 76 of the server 72 that has received the request to send the imprint image 44 responds to the client 86 to load the imprint image 44 from the memory 78 and send the image to the client (s55).

The CPU 30 of the client 86 that has received the imprint image 44 displays this imprint image 44 on the liquid crystal display 22 together with the icons 52a and 52b preliminarily stored in the memory 28 (s56).

In the case where either of the icons 52a and 52b is selected by the user (s57: Yes), the CPU 30 of the client 86 requests the server 72 to send special information 46 (s58). The CPU 76 of the server 72 that has received this request loads the special information 46 from the memory 78 and responds (s59).

The CPU 30 of the client 86 that has received the special information 46 displays the special information 46 on the liquid crystal display 22 (s60). As described above, a user's ticket is approved and the special information 46 is provided to the user. This stamp system 3 can manage trigger information such as the ticket image 42, the imprint image 44, and related information such as special information 46 in an integrated manner in the server 72, and thus, by only changing an image or information stored in the server 72, the image or the information provided to users can be changed all at once.

Further, the stamp system 3 according to the third embodiment of the present invention may be provided, in the memory 78 of the server 72, with a contact surface table 58 as shown in FIG. 6 (b). This contact surface table 58 includes a plurality of pieces of comparison information 48 specifying all arrangement patterns for contact surfaces 16, and stamp identification information corresponding to each of the plurality of pieces of comparison information 48 in corresponding fields to which a record will be provided per arrangement pattern of the contact surfaces 16. That is, if a maximum of 30 arrangement patterns can be applied for intrinsic contact surfaces 16d of stamp devices 10, a maximum of 30 records are provided in a contact surface table 58, in which each of the records includes comparison information 48 for each arrangement pattern, and identification information for a stamp device 10 having the arrangement pattern.

The server 72 including such a contact surface table 58 refers to, when comparing contact surface coordinates (s51), a contact surface table 58 to compare the received contact surface coordinates with the plurality of pieces of comparison information 48. Then, the server 72 extracts stamp identification information corresponding to the comparison information 48 to which the contact surface coordinates conform. Further, the server responds and confirms if this extracted stamp identification information conforms to the stamp identification information preliminarily associated with a ticket image, and provides, in the case where the information conforms, a result of comparison, including the stamp identification information (s52).

Another aspect of the invention includes a computer provided with a touch panel having an input surface to be inputted with positional information through a stamp type device when the stamp type device is placed on the input surface and including a computer program, wherein the computer (e.g., a processor) is configured to execute the computer program, and the computer program comprises instructions which, when executed by the computer, cause the computer to (a) display trigger information prompting an input through a stamp type device; (b) acquire the positional information inputted through the stamp type device; (c) display an imprint image representing an imprint corresponding to the stamp type device on the touch panel in the case where the acquired positional information satisfies a predetermined condition; (d) output guidance information for guiding an operation to instruct the computer in the case where the imprint image is displayed; and (e) output information relating to either or both of the trigger information and the imprint image in the case where the operation is performed in accordance with the guidance information.

In a further aspect of the invention, a computer program is executed by a computer including a touch panel having an input surface to be inputted with positional information through a stamp type device placed on the input surface so as to include instructions which, when executed by the computer, causes the computer to display trigger information prompting an input through the stamp type device on the touch panel, acquire the positional information inputted through the stamp type device, display an imprint image representing an imprint corresponding to the stamp type device on the touch panel in the case where the acquired positional information satisfies a predetermined condition, and output information relating to either or both of the trigger information and the imprint image in the case where the imprint image is displayed.

The present invention may take various aspects in which configurations described for any of the embodiments are modified or combined each other. To illustrate, variations of certain embodiments described below by way of example.

(Variation 1)

In the first embodiment of the present invention, the imprint image 44 may be an image representing a content relating to the content of the ticket image 42, such as portrait of an artist.

(Variation 2)

In the first embodiment of the present invention, the icons 52a and 52b may be overlapped outside the imprint image 44, i.e. on the ticket image 42.

(Variation 3)

In the first embodiment of the present invention, another GUI may be achieved through a mask image masking a photo image, i.e. special information 46, and a process executed by the CPU 30 to make a touched portion of the mask image transparent or translucent when a visitor touches.

(Variation 4)

In the first embodiment of the present invention, the stamp device 10 is not limited to an aspect where the stamp device is held and operated (stamped) by a receptionist, but may be an aspect where the stamp device is available at a predetermined position in an entrance so that a visitor can place (stamp) the stamp device on a touch panel 20.

(Variation 5)

In the first embodiment of the present invention, a plurality of types of stamp devices 10 in which each intrinsic contact surface is located at a different position may be used. At this time, an application includes a contact surface table 58 as described in the second embodiment of the present invention, and further includes a plurality of imprint images 44 and an imprint table (not shown). The imprint table includes imprint identification information applied to each of the imprint images 44, and stamp identification information applied to each of the stamp devices 10 in corresponding fields to which a record will be provided per each of the stamp devices 10. When the CPU 30 of the computer 36 compares acquired contact surface coordinates (s13), the CPU 30 retrieves, from the contact surface table 58, comparison information to which the acquired contact surface coordinates conform, and extracts stamp identification information corresponding to the retrieved comparison information. Then, when the CPU 30 displays one of the imprint images 44 (s15), the CPU 30 extracts, from the imprint table, imprint identification information corresponding to the extracted stamp identification information, and displays the one of the imprint images 44 applied with this imprint identification information.

Such a stamp system is a system in which a ticket image 42 is associated with a plurality of types of stamp devices 10 so that, for example, a different stamp device 10 is available per entrance to display an imprint image 44 with a content corresponding to the entrance.

In addition, such a system can display a plurality of imprint images 44 on one ticket image 42. At this time, the CPU 30 of the computer 36 may further change positions of the plurality of imprint images 44 to be displayed, according to a touch operation by a user. This can provide a puzzle for displaying an image (related information) by collecting the plurality of imprint images 44 in a predetermined arrangement.

(Variation 6)

In the first embodiment of the present invention, the application 40 may include a plurality of ticket images 42, such as a ticket image 42 for a seat S-1 and a ticket image 42 for a seat S-2. At this time, after the CPU 30 launches the application 40, the CPU 30 displays a screen for selection and displays one of the ticket images 42 selected by a visitor.

(Variation 7)

The first embodiment of the present invention is not limited to a concert event, but can be applied to tickets for other events. In addition, a ticket image 42, an imprint image 44, and special information 46 may be associated with a content of an event. For example, the first embodiment of the present invention may be applied to sports events such as professional baseball games. At this time, the ticket image 42 includes information such as an opponent, a baseball stadium, and a date and time. The imprint image 44 may be an image of a baseball player. The special information 46 may be a video of a team supporting song.

(Variation 8)

The first embodiment of the present invention is not limited to electronic tickets for admission, but may be used for electronic tickets of other purposes, for example, discount coupons available by customers of restaurants and other stores, and merchandise exchange tickets.

(Variation 9)

In the second embodiment of the present invention, a plurality of types of stamp devices 10 having intrinsic contact surfaces at different positions may be provided at check points. At this time, a check point table 70 will be provided with a record per each of all stamp devices 10 used for a stamp rally. In addition, check point identification information, a separate stamp sheet image, imprint identification information, related identification information, and an arrival flag are specified in association with respective stamp identification information.

Such a stamp system 2 is a system in which a separate stamp sheet image 62 is associated with a plurality of types of stamp devices 10 so as to allow participants to select one of the plurality of types of stamp devices 10 for stamping.

(Variation 10)

The second embodiment of the present invention is not limited to a music stamp rally, but can be applied to various stamp rallies. For example, the second embodiment of the present invention may be applied to a stamp rally for visiting stores in a shopping district for collecting stamps. At this time, a still image representing a store rounding course may be used as a whole stamp sheet image 60. In addition, an image representing an illustration of a store may be used as an imprint image 64. Further, an image representing a recommended product in a store or an image representing a special product in a store at a next check point may be used for related information.

(Variation 11)

In the first to third embodiments of the present invention, an "image" is not limited to a still image, but a video may be used. For example, trigger information may be a video, such as animation, for prompting an input through a stamp device 10. In addition, an imprint image may be a video, such as animation, representing that an input provided through a stamp device 10 conforms to comparison information. Further, an image used for an icon may be a video, such as animation, guiding an output of related information.

(Variation 12)

In the first to third embodiments of the present invention, "displaying an imprint image and an icon" includes an aspect where the imprint image and the icon are preliminarily displayed in a translucent manner (representing a deactivated state), and then, in the case where contact surface coordinates of a stamp device 10 conform to comparison information, the imprint image and the icon are displayed in an opaque manner (an activated state).

(Variation 13)

In the first to third embodiments of the present invention, related information may be a document relating to trigger information or an imprint image. For example, another aspect of related information according to the first embodiment of the present invention may be an artist's message document.

(Variation 14)

In the first to third embodiments of the present invention, an icon is not limited to an aspect where the icon is displayed with an imprint image at the same time, but may be displayed after the imprint image is displayed. For example, in the third embodiment of the present invention, when the CPU 30 of the client 86 displays the imprint image 44 and then receives display instruction information instructing display of the icons 52a and 52b from the server 72, the CPU 30 may display the icons 52a and 52b. In addition, in each of the first to third embodiments of the present invention, when the CPU 30 of the computer 36 displays an imprint image, the CPU 30 may start counting, and display an icon when a count value reaches a predetermined value. In addition, the computer 36 may include a Global Positioning System (GPS) (not shown) capable of communicating with the CPU 30. And the CPU 30 may acquire information from the GPS after displaying an imprint image and display an icon in the case where this information conforms to a predetermined position.

(Variation 15)

In the first to third embodiments of the present invention, an icon is an example of guidance information for guiding a user to operate to instruct the computer 36 to output related information.

(Variation 15-1)

The guidance information is not limited to an image such as icon, but may be a text. Such a text provides information guiding a user to related information such as "Playing a message video." The CPU 30 of the computer 36 displays the text on the touch panel 20, and outputs related information corresponding to a content of the text when the user selects the text. At this point, this text may preferably be highlighted with an underline or bold characters.

(Variation 15-2)

A computer 36 of a portable information terminal may include an acceleration sensor (not shown) capable of communicating with a CPU 30. And guidance information may be an image or a text representing a message such as "Please shake the terminal." The CPU 30 that has displayed such guidance information acquires a value output from the acceleration sensor, detects, based on a change amount of this output value, that the portable information terminal is shaken, and outputs related information. As described above, the acceleration sensor and the CPU 30 may be used as a user interface for accepting a user's input to the computer 36 to output the related information.

(Variation 15-3)

A computer 36 of a portable information terminal may include a brightness sensor (not shown) capable of communicating with a CPU 30. And guidance information may be an image or a text representing a message such as "Please trim off the room light." The CPU 30 that has displayed such guidance information acquires a value output from the brightness sensor, detects, based on a change amount of this output value, that an area around the portable information terminal becomes darker, and outputs related information. At this point, for example, an image sensor may be used as the brightness sensor. As described above, the brightness sensor and the CPU 30 may be used as a user interface for accepting a user's input to the computer 36 to output the related information.

(Variation 15-4)

A computer 36 of a portable information terminal may include a microphone (not shown), an amplifier (not shown) amplifying an electric signal output from this microphone, and a convertor (not shown) converting an analog signal output from the amplifier into a digital signal and inputting the digital signal to a CPU 30. And guidance information may be an image or a text representing a message such as "Please input a sound." The CPU 30 that has displayed such guidance information acquires a digital signal from the convertor, detects, based on a pattern of the acquired value, that the sound is input, and outputs related information. As described above, the microphone, the amplifier, the convertor, and the CPU 30 may be used as a user interface for accepting a user's input to the computer 36 to output the related information.

(Variation 15-5)

The guidance information is not limited to an image or a text displayed on the touch panel 20, but may be a sound output from a loudspeaker 34. In addition, an image or a text and a sound may be outputted together.

(Variation 15-6)

When a user selects a displayed imprint image, a CPU 30 of a computer 36 may outputted related information. That is, an imprint image itself may be allowed to function as guidance information.

(Variation 16-1)

In the first to third embodiments of the present invention, a value stored in a flag (entry flag 50, arrival flag 68, or conformity flag) is conformance information showing that contact surface coordinates of a stamp device 10 conform to comparison information. In addition, a storage destination of such conformance information is not limited to a flag storing a 1-bit value, but a variable storing a value including a plurality of bits.

(Variation 16-2)

The above described variable may store, in addition to conformance information, other information (hereinafter referred to as "additional information"). For example, in the case where contact surface coordinates of a stamp device 10 conform to comparison information, a CPU 30 allows the above described variable to store stamp identification information corresponding to the comparison information to which the contact surface coordinates conform as additional information. In addition, if a computer 36 includes a GPS, the CPU 30 may acquire information from the GPS, and store the acquired information into the above described variable as additional information in the case where contact surface coordinates of a stamp device 10 conform to comparison information. In addition, the computer 36 may include a real time clock module (hereinafter referred to as "RTC"). The CPU 30 acquires information from the RTC, and store the acquired information into the above described variable as additional information in the case where contact surface coordinates of a stamp device 10 conform to comparison information. Additional information is stored into a variable after conformance information (a bit stream of the additional information is serially combined into a bit stream of the conformance information).

(Variation 17)

In the first to third embodiments of the present invention, related information is outputted in the case where conditions are satisfied, i.e. in the case where trigger information is displayed, contact surface coordinates of a stamp device 10 used for stamping conform to comparison information, and an imprint image and guidance information are displayed. A condition to output related information is not limited to the above described conditions, but may include a fact that a user is approved. A user is approved, for example, through a flow described below.

First, a CPU 30 creates and stores a security code into a predetermined variable. A security code is, for example, a code in which intrinsic information applied to an application (hereinafter referred to as "app-intrinsic information") is used as a cryptographic key to encrypt intrinsic information applied to a portable information terminal (hereinafter referred to as "terminal intrinsic information"), and is created when a downloaded application is installed into a computer 36, and then stored into a predetermined variable. At this point, terminal intrinsic information is, for example, a serial number or a product number, or a phone number for a portable information terminal including a speech device, uniquely applied to the portable information terminal. In addition, app-intrinsic information is, for example, a serial number or a random number applied when an application is downloaded.

Then, before the CPU 30 outputs guidance information, the CPU 30 reads the security code from a variable, uses app-intrinsic information to decrypt the security code, and acquires terminal intrinsic information. Next, the CPU 30 compares the terminal intrinsic information acquired through decryption with actual terminal intrinsic information. Then, only in the case where each of the intrinsic information conforms, the CPU 30 outputs guidance information. On the other hand, in the case where each of the intrinsic information does not conform, the CPU 30 determines that the application in the portable information terminal is copied illegally, and does not output the guidance information.

By decrypting a security code and performing a comparison with actual terminal intrinsic information, a portable information terminal can be confirmed for legitimacy. That is, related information can be outputted for only users who have legally acquired an application.

At this point, decrypting a security code and comparison may be performed at any timing, such as before displaying trigger information, before displaying an imprint image, and before outputting related information.

In addition, a storage destination for a security code and app-identification information may be a variable in which the above described conformance information will be stored.

In addition, instead of terminal intrinsic information, user intrinsic information may be used. User intrinsic information includes user identification information and a password entered by a user when the user installs an application.

(Variation 18)

The comparison information and the comparison methods described in the first to third embodiments of the present invention are merely examples, and other comparison information and comparison methods may be employed. For example, a reference coordinate c may be specified to an origin in an orthogonal coordinate system to specify a position of an intrinsic coordinate d with regard to this origin as comparison information. At this time, a CPU 30 that has acquired contact surface coordinates may acquire an orthogonal coordinate system based on the approved reference coordinates a to c, and then acquire a position of an intrinsic coordinate d in this orthogonal coordinate system to determine whether the acquired values conform to the comparison information.

(Variation 19)

In the first to third embodiments of the present invention, a stamp device 10 may include four or more projections 14 and four or more contact surfaces 16. Comparison information and a comparison method at this time may be determined as appropriate per an application program.

(Variation 20)

In the first to third embodiments of the present invention, a touch panel 20 may be a touch panel with another detection style as long as a multi-touch detection is possible. For example, the touch panel 20 may be a pressure sensitive touch panel detecting a pressure applied on an input surface of the touch panel to acquire a coordinate on the input surface.

The present invention can be implemented in various aspects that have been improved, amended, or modified based on a knowledge of those skilled in the art within a scope of the present invention, and these aspects all belong to the scope of the present invention.

In the present invention, the above described guidance information is not a necessary configuration. For example, in the first embodiment of the present invention, in the case where a predetermined period has passed, after an imprint image 44 is displayed, as a condition, related information such as information notifying an upcoming concert may be displayed.

There have thus been shown and described a novel method, a novel computer, and a novel stamp system which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method comprising the steps of:
   a) displaying, on a touch panel of a user terminal, trigger information prompting an input through a stamp type device which inputs positional information to the touch panel;
   b) acquiring the positional information inputted through the stamp type device;
   c) outputting guidance information for guiding an input to the user terminal in a case where the acquired positional information satisfies a predetermined condition, the input to the user terminal being different from the input through the stamp type device;
   d) confirming, by the user terminal, an input in accordance with the guidance information in a case where the guidance information is outputted; and
   e) outputting special information to the user terminal accompanying the input in accordance with the guidance information,
   in the step (c), an imprint image representing an imprint corresponding to the stamp type device being displayed on the touch panel in the case where the acquired positional information satisfies the predetermined condition, and the guidance information being outputted in a case where the imprint image is displayed, and the special information relating to either of both of the trigger information and the imprint image.

2. The method according to claim 1, wherein
in the step (c), the guidance information and the imprint image are displayed in an overlapped manner.

3. The method according to claim 1, further comprising a step of:
calculating a coordinate of the stamp type device on the touch panel based on the positional information acquired in the step (b),
in the step (c), a position of the imprint image to be displayed being determined based on the calculated coordinate, and the guidance information being displayed in a state where the imprint image is displayed at the position.

4. The method according to claim 1, further comprising a step of:
calculating a coordinate of the stamp type device on the touch panel based on the positional information acquired in the step (b),
in the step (c), a position of the imprint image to be displayed being determined based on the calculated coordinate, and the guidance information being displayed in an overlapped manner in a state where the imprint image is displayed at the position.

5. The method according to claim 1, further comprising a step of:
calculating a coordinate of a center of the stamp type device on the touch panel based on the positional information acquired in the step (b),
in the step (c), the imprint image being displayed at the calculated coordinate of the center, and the guidance information being displayed in a state where the imprint image is displayed.

6. The method according to claim 1, further comprising a step of:
calculating a coordinate of a center of the stamp type device on the touch panel based on the positional information acquired in the step (b),
in the step (c), the imprint image being displayed at the calculated coordinate of the center, and the guidance information being displayed in an overlapped manner in a state where the imprint image is displayed.

7. The method according to claim 1, wherein
the input in accordance with the guidance information includes shaking the user terminal.

8. The method according to claim 1, further comprising:
f) storing conformance information indicating the satisfaction into a variable; and
g) displaying the imprint image representing an imprint corresponding to the stamp type device when the conformance information is stored in the variable.

9. The method according to claim 1, wherein
the guidance information is an image or a text, and
in the step (c), the image or the text is displayed on the imprint image in an overlapped manner.

10. The method according to claim 1, wherein
the imprint image is allowed to function as the guidance information.

11. The method according to claim 1, wherein
the trigger information is an image representing a content of a service, and provided by a provider of the service.

12. The method according to claim 1, wherein
the special information includes a document, a sound, or an image.

13. The method according to claim 1, wherein
the guidance information includes a sound.

14. A computer provided with a touch panel having an input surface to be inputted with positional information through a stamp type device when the stamp type device is placed on the input surface and including a computer program, wherein the computer is configured to execute the computer program, and the computer program comprises instructions which, when executed by the computer, cause the computer to:
display, on a touch panel of the computer, trigger information prompting an input through the stamp type device;
acquire the positional information inputted through the stamp type device;
output guidance information for guiding an input to the computer in case where the acquired positional information satisfies a predetermined condition, wherein the input to the computer is different from the input through the stamp type device;
confirm, by the computer, an input in accordance with the guidance information in a case where the guidance information is outputted; and
output special information to the computer accompanying the input in accordance with the guidance information,
an imprint image representing an imprint corresponding to the stamp type device being displayed on the touch panel in the case where the acquired positional information satisfies the predetermined condition, and the guidance information being outputted in a case where the imprint image is displayed, and
the special information relating to either of both of the trigger information and the imprint image.

15. A stamp system comprising:
a computer including a touch panel having an input surface; and
a stamp type device placed on the input surface of the touch panel to input positional information with respect to the input surface,
wherein the computer further includes an acquisition unit configured to acquire the positional information inputted through the stamp type device,
a trigger information display unit configured to display trigger information prompting an input through the stamp type device on the touch panel, and
an output unit configured to output guidance information for guiding an input to the computer in case where the acquired positional information satisfies a predetermined condition, wherein the input to the computer is different from the input through the stamp type device,
after guidance information is outputted, confirming, by the computer, an input in accordance with the guidance information in a case where the guidance information is outputted; and
outputting special information to the computer accompanying the input in accordance with the guidance information,
the output unit being further configured to display an imprint image representing an imprint corresponding to the stamp type device on the touch panel in the case where the acquired positional information satisfies the predetermined condition, and output the guidance information in a case where the imprint image is displayed, and the special information relating to either of both of the trigger information and the imprint image.

* * * * *